(12) United States Patent
Chen et al.

(10) Patent No.: US 10,947,121 B2
(45) Date of Patent: Mar. 16, 2021

(54) INTERCONNECTED REDUCED GRAPHENE OXIDE

(71) Applicant: LAKEHEAD UNIVERSITY, Thunder Bay (CA)

(72) Inventors: Aicheng Chen, Thunder Bay (CA); Boopathi Sidhureddy, Thunder Bay (CA); Antony Raj Thiruppathi, Thunder Bay (CA)

(73) Assignee: Lakehead University, Thunder Bay (CA)

( * ) Notice: Subject to any disclaimer, the term of this patent is extended or adjusted under 35 U.S.C. 154(b) by 63 days.

(21) Appl. No.: 16/280,505

(22) Filed: Feb. 20, 2019

(65) Prior Publication Data

US 2019/0263664 A1 Aug. 29, 2019

Related U.S. Application Data

(60) Provisional application No. 62/635,004, filed on Feb. 26, 2018.

(51) Int. Cl.
| | | |
|---|---|---|
| *C01B 32/198* | (2017.01) | |
| *B82Y 40/00* | (2011.01) | |
| *B82Y 30/00* | (2011.01) | |

(52) U.S. Cl.
CPC ............ *C01B 32/198* (2017.08); *B82Y 30/00* (2013.01); *B82Y 40/00* (2013.01); *C01P 2002/60* (2013.01); *C01P 2002/70* (2013.01); *C01P 2002/82* (2013.01); *C01P 2002/85* (2013.01); *C01P 2004/03* (2013.01); *C01P 2004/04* (2013.01); *C01P 2004/30* (2013.01); *C01P 2006/40* (2013.01)

(58) Field of Classification Search
None
See application file for complete search history.

(56) References Cited

U.S. PATENT DOCUMENTS

2015/0122800 A1* 5/2015 Gallastegui ........... C01B 32/182
219/553

OTHER PUBLICATIONS

Ayele et al.; Controlled Synthesis, Characterizatrion and Reduction of Graphene Oxide: A Convenient Method for Large Scale Production; Egyptian Journal of basic and Applied Sciences; 74-79 (Year: 2017).*

* cited by examiner

*Primary Examiner* — Guinever S Gregorio
(74) *Attorney, Agent, or Firm* — Michael R Williams; Kyle R Satterthwaite; Ade & Company Inc.

(57) ABSTRACT

A one-pot approach for the scalable production of novel interconnected reduced graphene oxide (IC-RGO) is demonstrated). The method consists of two steps: oxidation of graphite into graphene oxide (GO); and concomitant reduction and interconnection of GO. IC-RGO is formed without additional chemical and reduction agents. Instead, interconnection of graphene oxide is enabled thorough inherently presenting oxygen functional groups produced during the first step of synthesis.

11 Claims, 10 Drawing Sheets

US 10,947,121 B2

INTERCONNECTED REDUCED GRAPHENE OXIDE

PRIOR APPLICATION INFORMATION

The instant application claims the benefit of U.S. Provisional Patent Application 62/635,004, filed Feb. 26, 2018, entitled "INTERCONNECTED REDUCED GRAPHENE OXIDE", the entire contents of which are incorporated herein by reference.

BACKGROUND OF THE INVENTION

Graphene has demonstrated advanced applications in the growing emergence of green energy technologies.[1] In parallel with the advancement of graphene from research and development to applications, the commercial production of graphene and related materials is required to attain a level 9 Technology Readiness Level (TRL9).[2] Numerous synthetic methodologies have been explored such as mechanical-, solution-, and chemical-based approaches; however, each technique differs insofar as scalability and characteristics, which consequently influences the properties of the resulting graphene.[3] As relates to pristine graphene for electrochemical applications, the inherent restacking of graphene layers on the electrode surface significantly decreases the electroactive surface area and electrochemical activity.[3b,4] Chemical methods continue to stand out as a promising pathway for the mass production of high quality graphene derivatives.[5] Among them, the improved Hummers method, reported by Tour and co-workers,[6] has been widely employed for the oxidation of graphite.[7] However, conventional synthetic methods are time consuming, involve multiple steps, and consume vast quantities of chemicals and solvents for the mass production of graphene and reduced graphene oxide (RGO).

Aside from 2D graphene, 3D hierarchical structures have emerged as compelling research due to their promising energy and environmental applications.[8] Importantly, 3D graphene superstructure exhibits improved heterogeneous electron transfer kinetics over 2D graphene derivatives and 3D porous carbon materials.[3b,8c] It might also serve as a 3D conducting support for catalytic particles in enhanced electrocatalysis.[3b,9] Further, 3D architectures may overcome the restacking issues of graphene sheets to a significant degree. In recent years, several research groups have attempted to create such 3D graphene using template-assisted chemical vapor deposition (CVD), lithography, and chemical methods.[8c,8d,10] However, it is known that the interconnectivity of graphene sheets with covalent linkages is imperative for the stable 3D graphene structure using some network linkers (e.g., glutaraldehyde, resorcinol, polyallylamine, DNA).[8d,11] For example, in the existing methods for preparation of 3D graphene materials involving multiple steps, the first stage is the preparation of graphene oxide (GO) followed by the interlinking process. The interlinking process involves various chemicals such as resorcinol and glutaraldehyde to incorporate covalent linkages between graphene oxide sheets. For instance, there is a method reported in the literature where first, GO is prepared by an improved Hummers method and then the synthesized GO is subjected to interlinking. For the interlinking, GO is dispersed water and then treated using borax, resorcinol and glutaraldehyde. The obtained solution is sonicated and freeze-dried to get 3D graphene oxide [8d]. To synthesize 3D graphene, a chemical reduction process is further required for 3D-GO [8c]. In another reference, GO has been prepared using a modified Hummers method. Aqueous dispersions of GO and DNA in different proportions were mixed and heated in an oven to obtain 3D hydrogels of GO [11]. The inter-linkers are added to establish a covalent interconnection between sheets and to form a 3D structure. However, because this interconnection occurs as a separate step, the time and energy required for the process is increased. Moreover, as for electrochemical applications, the impact of these network linkers on the electrochemical performance of 3D graphene cannot be excluded and are unavoidable.[12] Hence, an alternative approach for the creation of new types of interconnected 3D graphene superstructures without the use of network linkers is highly desirable.

SUMMARY OF THE INVENTION

According to a first aspect of the invention, there is provided a method of producing an interconnected, reduced graphene oxide comprising:

(a) oxidizing a quantity of graphite for a period of time with an acid mixture comprising manganese, thereby producing a layer structured graphene oxide; and (b) heating the layer structure graphene oxide to 100-120° C. for about 15 minutes, thereby forming interconnected, reduced graphene oxide.

According to another aspect of the invention, there is provided an interconnected, reduced graphene oxide layer comprising at least 5 interconnected, reduced graphene oxide sheets wherein each sheet is separated by about 0.37 nm.

In some embodiments, during the second step, simultaneous chemical reduction and interconnection were achieved to form IC-RGO.

In some embodiments, the interconnection of the GO sheets was simultaneously enabled through covalent linkages without the addition of external linkers.

In some embodiments, the inherent —OH and —COOH groups of GO formed during the first oxidation step may involve in the second acid catalyzed condensation step at 120° C. and interconnection between graphene sheets achieved via the formation of ether and ester groups.

DESCRIPTION OF THE PREFERRED EMBODIMENTS

Figure 1:
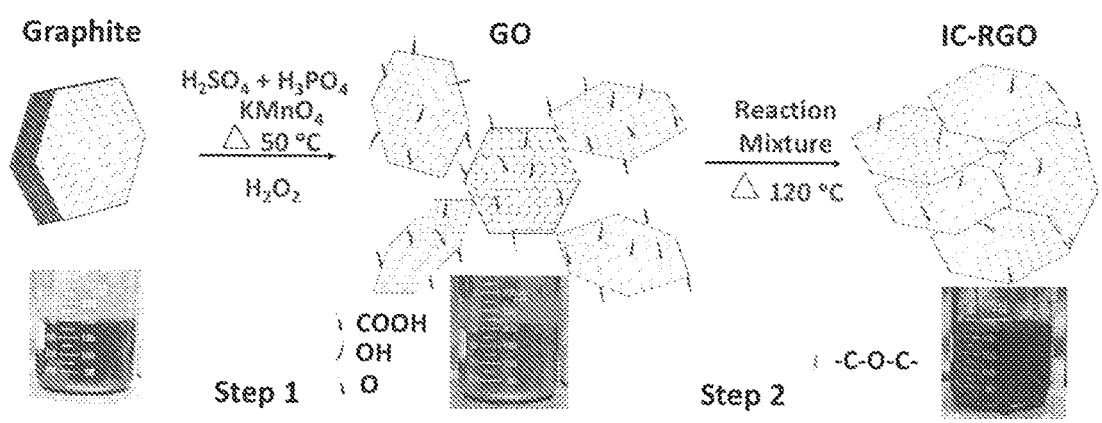
FIG. 1. Schematic of the synthesis of 3D interconnected reduced graphene oxide from graphite.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

Herein, we report on a facile one-pot synthesis for the scalable production of 3D interconnected reduced graphene oxide (IC-RGO) using our invented streamlined Hummer's method (SHM). As illustrated in Scheme 1, by controlling the temperature and time, IC-RGO may be produced using the following two steps. Firstly, graphite was oxidized to graphene oxide. Secondly, graphene oxide (GO) was reduced in the same reaction vessel (without its removal), with an acid mixture and manganese. It should be noted that despite a long-existing method for the oxidation of graphite, [2b,7a,13] all of the experiments reported in the literature were conducted at a temperature under 90° C. By increasing the temperature from 50 to 120° C., for example, from about 100° C. to about 120° C. in the second step, our studies have revealed that a significant quantity of oxygen functional groups were removed from the GO that were formed in the first step, whereafter the interconnection of the GO sheets was simultaneously enabled through covalent linkages without the addition of external linkers. Moreover, the advantages of the formed 3D IC-RGO were examined, and its capacitance performance was compared with conventionally synthesized 2D RGO.

An innovative one-pot approach for the scalable production of novel IC-RGO is demonstrated, and we name it the streamlined Hummers method (SHM). The SHM consists of two steps, whereas 1) Oxidation of graphite into GO; 2) Concomitant reduction and interconnection of GO. The novelty of the synthetic process is in the second step, which we invented to reduction and interconnection of GO. IC-RGO is formed without additional chemical and reduction agents. Interconnection of graphene oxide is enabled thorough inherently presenting oxygen function groups produced during the first step of synthesis.

It is an innovative approach to design new type of 3D IC-RGO. The resulting IC-RGO may be utilized in various graphene based applications, such as supercapacitors, batteries, adsorbents, electrocatalyst support materials, filters, and to construct functional nanocomposites.

According to an aspect of the invention, there is provided a method of producing an interconnected, reduced graphene oxide comprising:

(a) oxidizing a quantity of graphite for a period of time with an acid mixture comprising manganese, thereby producing a layer structured graphene oxide; and (b) heating the layer structure graphene oxide to 100-120° C. for about 15 minutes, thereby forming interconnected, reduced graphene oxide.

The method wherein the interconnected, reduced graphene oxide is in the form of interconnected, reduced graphene oxide sheets.

In some embodiments, there are at least 5 reduced graphene oxide sheets interconnected, for example, about 5 to about 8 reduced graphene oxide sheets interconnected.

The distance between each sheet may be about 0.37 nm.

In some embodiments, the oxidization of the graphite takes place at about 50° C. for about 15 hours.

In some embodiments, the manganese is permanganate oxidant.

In some embodiments, step (a) is carried out at about 50° C.

In some embodiments, between step (a) and step (b), the temperature of the layer structured graphene oxide is reduced to about 10° C. At this time, $H_2O_2$ may be added, as discussed below.

In some embodiments, after step (b), the interconnected, reduced graphene oxide is rinsed, as discussed below. The interconnected, reduced graphene oxide may be rinsed with HCl, water and ethanol.

In the first step of the synthesis, the GO produced was in a 2D layered morphology. During the second step, all GO layers were interconnected covalently and entirely converted into a stable 3D IC-RGO structure with an Interlayer distance of about 0.37 nm. The crystallite size (Lc) calculated from XRD analysis in c direction was 1.81 nm. From this information, the number of layers calculated to be approximately 5.

During the heat treatment at 100-120° C., the inherent —OH and —COOH groups of the GO formed during the first oxidation step involving the second acid catalyzed condensation enabled interconnection between the graphene sheets via formation of ether and ester groups. The interconnection between graphene oxide sheets was confirmed with the support of FT-IR and XPS analysis, as discussed below.

While not wishing to be bound to a specific theory or hypothesis, it is believed that higher temperatures were not tried previously because of concerns that the oxidative environment would cause cleavage of C═C bonds and lead to disintegration of planes, which in turn would lead to the generation of voids and carbon loss in the form of $CO_2$[18,19]. In addition, heating of the reaction mixture may have been considered unsafe due to the presence of concentrated acid, which could have exploded or led to toxic gas generation.

However, in our invention, graphite oxidation was conducted under controlled conditions for 15 hr during the first step. Following the first step, the reaction mixture treated the IC-RGO at a higher temperature for a shorter time interval (5-20 min).

As discussed herein, we have optimized the heat treatment duration as 15 minutes, as 15 minutes heat treatment produced interconnected reduced graphene oxide (IC-RGO-15) with fewer defect density and smaller charge transfer resistance. After 15 minutes, we did not observe any definite changes in morphology; however, increased defect density was observed at 20 minutes, as discussed herein. Accordingly, it is believed that heating for a longer period of time will cause disintegration of the structure.

In order to synthesize IC-RGO, graphite was oxidized at 50° C. according to the improved Hummers method with some modifications;[6] and the details are described in the Experimental Section. Following 15 hours of harsh acid treatment with permanganate oxidant, the temperature of the reaction mixture was reduced to 10° C., and $H_2O_2$ was slowly added into the reaction mixture under stirring to produce brown GO, as seen in FIG. 1. Subsequently, the temperature of the reaction vessel was increased to 120° C. for the reduction and interconnection of GO, to form IC-RGO. Subsequent to being treated at 120° C. for 15 minutes, the color of the reaction mixture was completely transformed from brown to black, as shown in FIG. 1. The final black product was centrifuged and rinsed with HCl, water, and ethanol to remove impurities. The same rinsing procedure was also followed to purify the GO that was synthesized during the first step for comparison with IC-RGO.

Figure 2:
FIG. 2. A) FE-SEM and B) AFM image of the synthesized GO.
Figure 3:
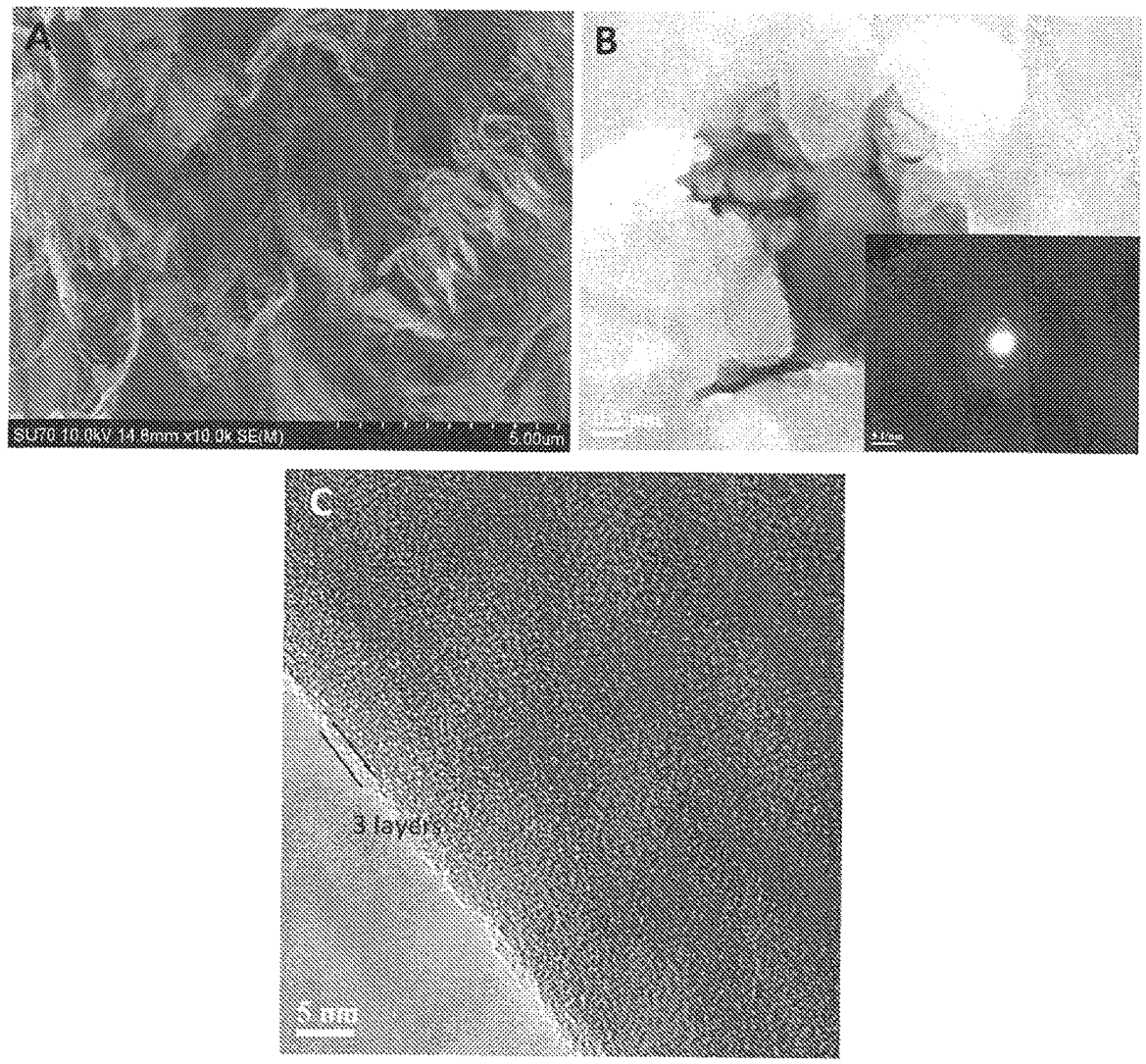
FIG. 3. A) FE-SEM image of IC-RGO-15, B) TEM image of IC-RGO-15. Inset: the SAED pattern of IC-RGO-15, and C) HR-TEM image of the synthesized IC-RGO-15.
Figure 4:
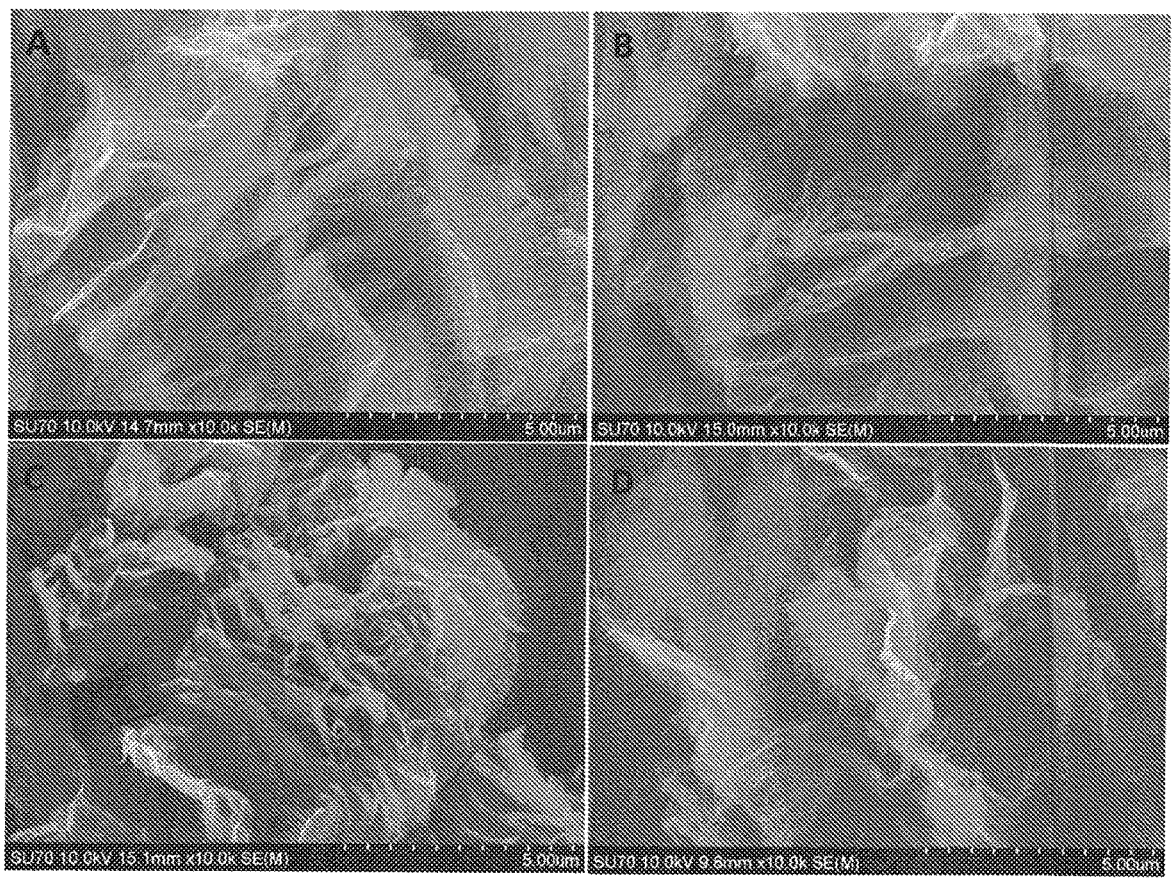
FIG. 4. FE-SEM images of the synthesized graphene based nanomaterials: A) IC-RGO-5, B) IC-RGO-10, C) IC-RGO-20, and D) T-RGO samples.
Figure 5:
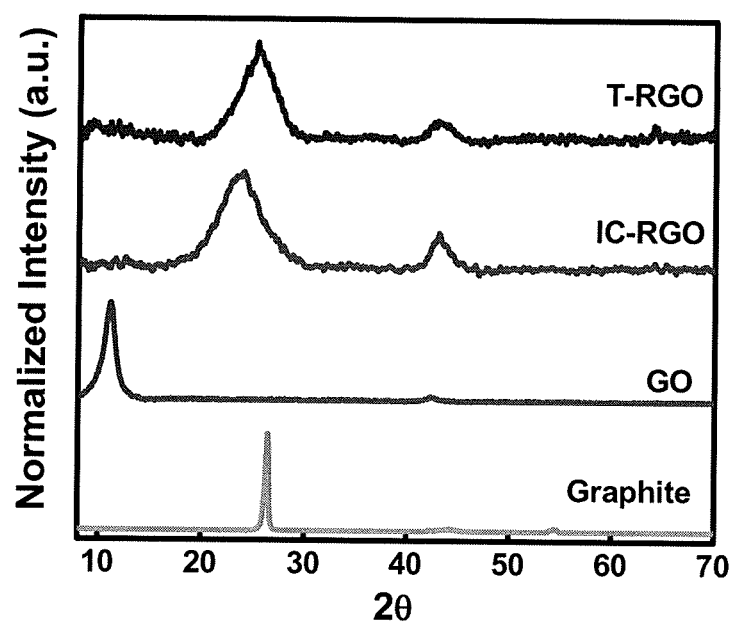
FIG. 5. XRD pattern of graphite, GO, IC-RGO-15 and T-RGO.

As shown in the FE-SEM image (FIG. 2A), a layer structured GO was produced during the first step of the SHM. AFM analysis revealed that the thickness of the GO sheets was varied from 1.0 to 1.5 nm (FIG. 2B). Upon thermal treatment at 120° C. for 15 minutes denoted as IC-RGO-15, the structure was dramatically altered, as shown in FIG. 3A. The resulting IC-RGO-15 was highly interconnected, and the TEM image is displayed in FIG. 3B, which confirmed the formation of the porous structure. A typical hexagonal symmetry pattern is representative for graphene layers (Inset of FIG. 3B). A high-resolution TEM image is displayed in FIG. 3C, confirming that only a few layers existed in the formed IC-RGO. In addition, we investigated the effects of time, while the temperature was maintained at 120° C., on the concomitant reduction and inter connection process, which varied from 5 to 20 minutes and the resulting interconnected reduced graphene oxides named as IC-RGO-5, 10, 15, and 20, respectively. The structure of the resulting products was characterized using FE-SEM, and the images are displayed in FIG. 4. When the time was increased from 5 to 15 minutes, the thickness of the layers was decreased. A highly porous and well-interconnected 3D superstructure was formed after being treated at 120° C. for 15 minutes. No obvious change was observed when further increasing the time from 15 to 20 minutes. For comparison, the FE-SEM image of the thermally reduced GO at 900° C. (T-RGO) is also displayed in FIG. 4D, showing the formation of a crumpled 2D structure. FIG. 5 depicts the XRD patterns of graphite, GO, IC-RGO-15, and T-RGO, revealing the effective oxidation of graphite and efficient reduction of the formed GO in our one-pot SHM. The disappearance of the 2θ peak at 26.4° confirmed that graphitic flakes were completely oxidized to form GO during the initial step. Further analysis revealed that the interlayer spacing of graphite was significantly increased from 0.336 to 0.794 nm due to the creation of oxygen functional groups. During the second step, simultaneous chemical reduction and interconnection were achieved to form IC-RGO, which possessed a similar XRD pattern to T-RGO. The 2θ peak of GO shifted from 11.10 to 24.02°, and the interlayer distance was decreased to 0.37 nm. In addition, peak broadening was observed at 24.02°, indicating that the mean crystallite length along c-axis (Lc) of IC-RGO (1.81 nm) was shorter than that of GO (6.42 nm). Based on the calculated Lc and interlayer distance, the number of layers of graphene in a stacked nanostructure was estimated to be ~5 and ~8 for the formed IC-RGO and GO, respectively.

Figure 6:
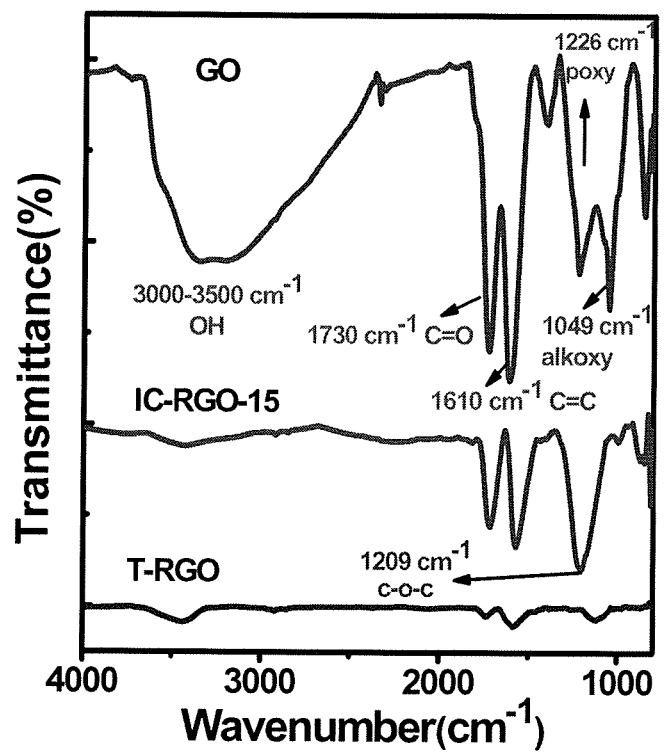
FIG. 6. FT-IR spectra of GO, IC-RGO-15, and T-RGO.
Figure 7:
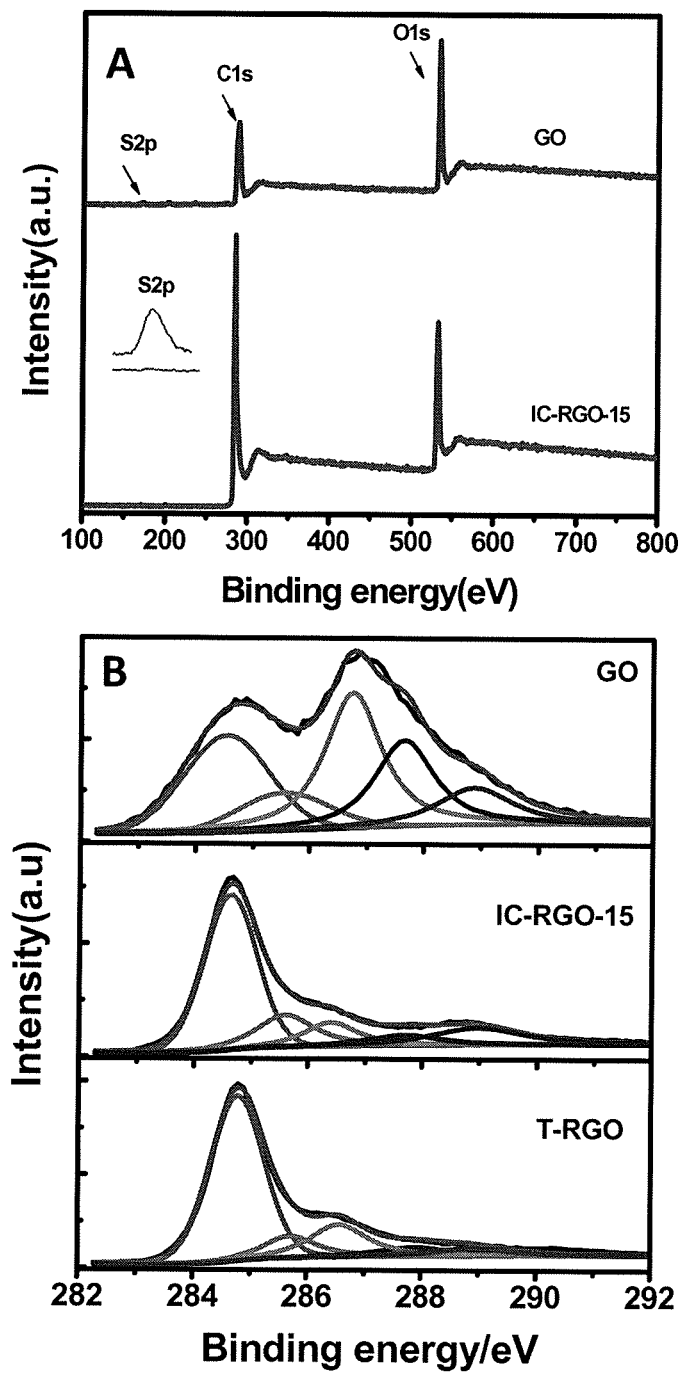
FIG. 7. A) XPS survey spectra of GO and IC-RGO-15 and B) High resolution C1s spectra of GO, IC-RGO-15, and T-RGO.
Figure 8:
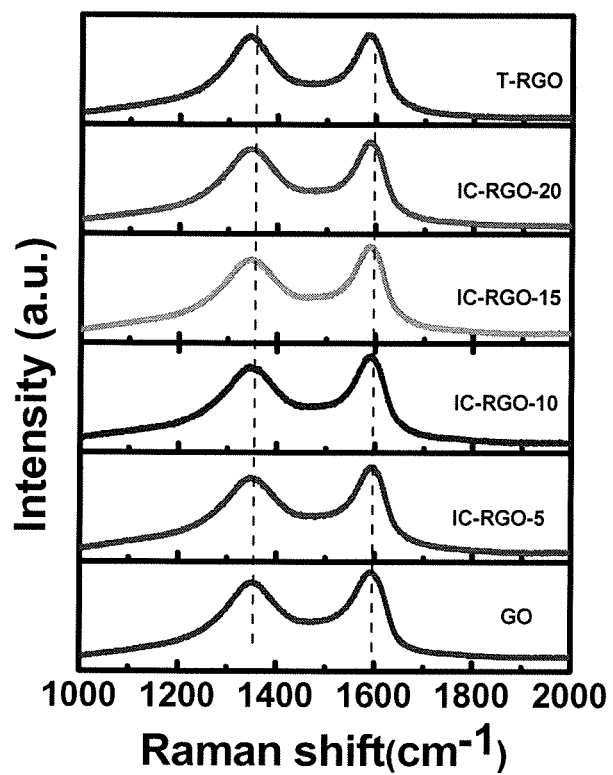
FIG. 8. Raman spectra of the GO, IC-RGO-(5, 10, 15, and 20), and T-RGO samples.

FT-IR spectroscopy was employed to characterize the functional groups of GO and IC-RGO, as shown in FIG. 6. Representative peaks for oxygen functional groups, such as hydroxyl (OH @3000-3500 $cm^{-1}$), carbonyl(C=O@1730 $cm^{-1}$), epoxy (C—O @ 1230 $cm^{-1}$) and C—O (@1390 and 1061 $cm^{-1}$) groups were observed for GO. Following the thermal treatment of GO in the presence of an acid mixture at 120° C., there was notable change in the functionalities of IC-RGO, wherein a large fraction of the oxygen functional groups were removed; specifically, the OH group practically vanished. In contrast, a new strong peak appeared at 1209 $cm^{-1}$, which was attributed to acid catalyzed formation of ether and ester in the strong acid mixture, resulting in the formation of 3D IC-RGO. The inherent —OH and —COOH groups of GO formed during the first oxidation step may involve in the second acid catalyzed condensation step at 120° C. and interconnection between graphene sheets achieved via the formation of ether and ester groups. Conversely, as shown in the FT-IR spectrum of T-RGO, the functional groups were substantially removed upon the thermal annealing of GO in an inert atmosphere, leading to the formation of the crumpled 2D structure rather than the interconnected 3D superstructure. Further, X-ray photoelectron spectroscopy (XPS) was utilized to determine the carbon/oxygen content of the GO and IC-RGO. FIG. 7A shows the survey spectra. For GO, the percentages of C, O, and S were 64.5%, 34.5%, and 1.0%, respectively. In the case of IC-RGO, no S peak was observed. The percentage of C was increased to 79.5%, while the O content was decreased to 20.5%. Even though a similar rinsing procedure was carried out for GO and IC-RGO, the sulfur content could not be completely removed from the GO due to a small fraction of sulfur intercalated in the graphene oxide sheath; however, IC-RGO can be more easily purified due to its inherent porous network, as well as the reduced number of oxygen functional groups in comparison to GO. FIG. 7B displays the high-resolution C1s XPS spectra of GO, IC-RGO, and T-RGO. For GO, two strong peaks appeared, which might be deconvoluted into five peaks, corresponding to the C=C (284.6 eV), C—C(285.5 eV), C—O (epoxy and hydroxyl, 286.6 eV), C=O (287.6 eV), and O=C—O (288.8 eV) bonds. On the other hand, the spectra of IC-RGO and T-RGO were nearly identical; the intensities of all C1s peaks of the carbon-bound oxygen functional groups were decreased dramatically, as shown in Table 1, revealing that most of the oxygen containing functional groups were removed, and that GO was effectively reduced during the second step of the SHM. Further, micro Raman spectroscopy was employed to examine the defect density ($I_D/I_G$) and crystallite size (La) of the synthesized GO, IC-RGO, and T-RGO samples. As shown in FIG. 8, the G and D peaks appeared at ~1590 and ~1350 $cm^{-1}$, respectively. As seen in Table 2, IC-RGO-15 had the crystallite size of 19.9 nm and lowest defect density, compared to GO, IC-RGO-(5, 10, & 20), and T-RGO, which confirmed that 15 minutes of heat treatment at 120° C. resulted in the formation of high quality interconnected reduced graphene oxide with low defects. In general, $sp_2$ domains in GO are isolated by oxygen atoms; hence, the removal of oxygen functionalities is an important step in the reduction, which leads to the formation of new $sp_2$ clusters. In the case of IC-RGO, during the second step of SHM, the reduction and interconnection processes occurred simultaneously in the presence of the strong acid mixture, thus decreasing the defects. However, further increasing the reaction interval from 15 to 20 min might lead to the strong acid mixture disintegrating the IC-RGO, resulting in an increase in defects. In the case of T-RGO, the thermal treatment increased structural defects of graphene oxide due to the evolution of CO and/or $CO_2$ species from epoxy groups.[3c]

Figure 9:
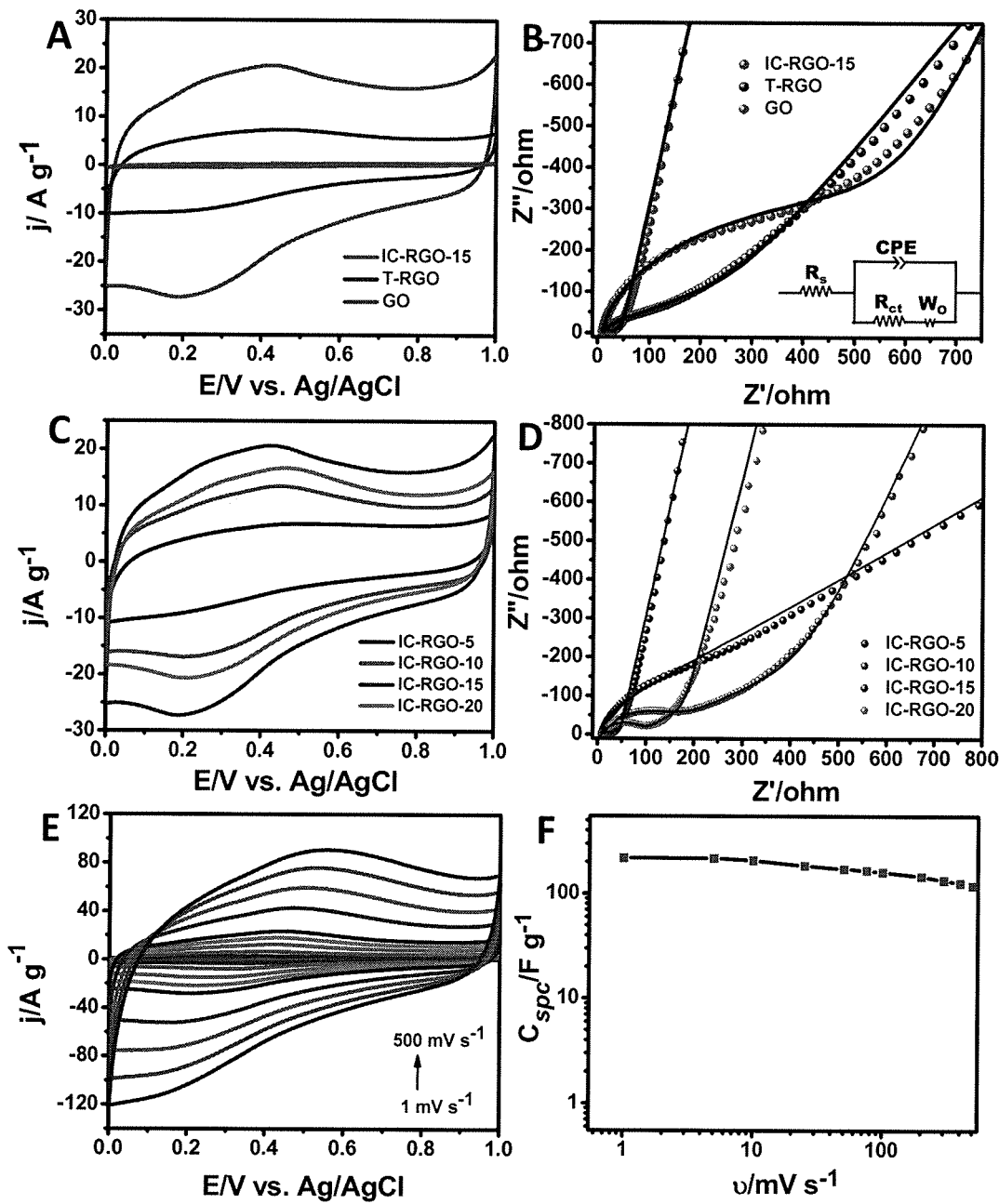
FIG. 9. A) Cyclic voltammograms of IC-RGO-15, T-RGO, and GO. B) Nyquist plots of IC-RGO, T-RGO and GO in 0.5 M $H_2SO_4$ at 0.325 V from ac frequency range 100 kHz 0.01 Hz, where the filled circle represents the experimental data, and the black line denotes the fitted curve using the proposed equitant electrical circuit (the inset); C) CV curves of different IC-RGO samples recorded in 0.5 M $H_2SO_4$, D) Nyquist plots of different IC-RGO samples measured in 0.5 M $H_2SO_4$ at 0.325 V vs Ag/AgCl, where the filled circle represents the experimental data, and the black line denotes the fitted curve, E) Scan rate effect of IC-RGO-15 in 0.5 M $H_2SO_4$, and F) Specific capacitance of IC-RGO-15 at different scan rates.
Figure 10:
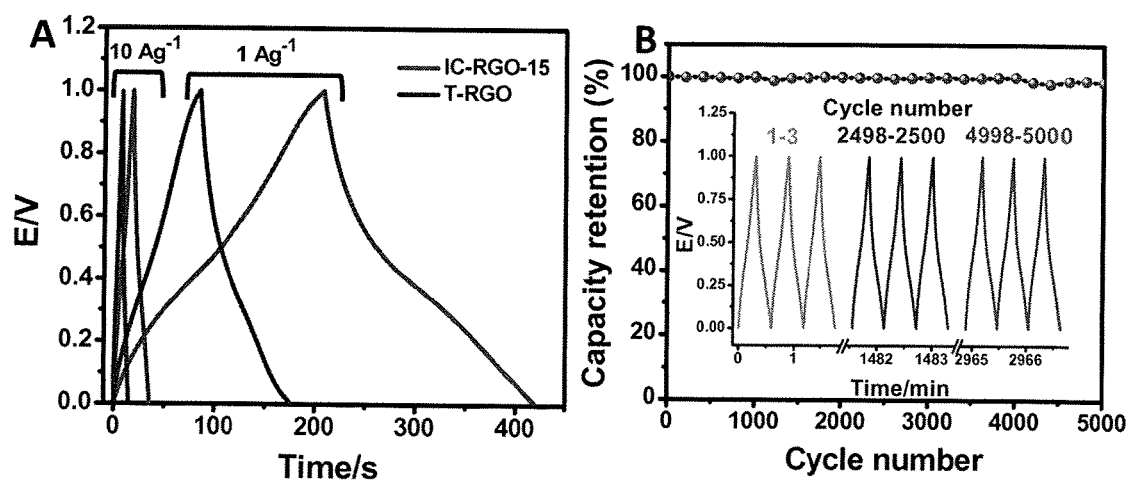
FIG. 10. A) Charging/discharging curves of IC-RGO-15 and T-RGO. B) Stability of IC-RGO-15 for 5000 cycles. Inset shows the charging/discharging curves of IC-RGO-15 at 10 A $g^{-1}$.

Multidimensional materials and their hybrid architectures are anticipated to address various issues for the next generation of energy storage devices.[14] The one-pot synthesized 3D IC-RGO superstructure may provide a new platform for the construction of advanced systems for various energy and environmental applications. We further tested the IC-RGO for a supercapacitor application. FIG. 9A depicts the cyclic voltammograms of IC-RGO-15, T-RGO, and GO. The rectangular-like shape and the redox process of the surface bound oxygen functional groups make the IC-RGO-15 exhibit a capacitance of 158 F $g^{-1}$ at 0.1 V $s^{-1}$, which is much higher than that of GO (2.3 F $g^{-1}$) and T-RGO (54.2 F $g^{-1}$). As seen in the SEM image, the formed IC-RGO had highly interconnected stable 3D structure, which overcame the inherent restacking issues of 2D T-RGO, thus significantly increasing the electrochemically active surface area. Meanwhile, these nanomaterials were investigated using electrochemical impedance spectroscopy (EIS) as presented in FIG. 9B, revealing that the charge transfer resistance (Rct) was increased in the following order: IC-RGO-15 (17Ω)<T-RGO (29.3Ω)<GO (359Ω). Further, as seen in FIGS. 9C and 9D, IC-RGO-15 had the lowest Rct and the highest capacitance in contrast to the synthesized IC-RGO-(5, 10, and 20). FIG. 9E displays the CVs of IC-RGO-15 recorded at different scan rates that varied from 1 to 500 mV $s^{-1}$; similar shapes were observed over a wide range of scan rates, and the calculated specific capacitance vs. scan rate is presented in FIG. 9F, indicating good capacitive performance and high-rate capabilities. The capacitance performance of IC-RGO-15 was further validated using charging/discharging methods at 1.0 and 10.0 A $g^{-1}$, and compared with T-RGO, as presented in FIG. 10A. Their specific capacitances were calculated to be 212 F $g^{-1}$ @ 1 A $g^{-1}$ and 176 F $g^{-1}$ @ 10 A $g^{-1}$ for IC-RGO, which were more than twice as high as that of T-RGO (93 F $g^{-1}$ @ 1 A $g^{-1}$ and 70 F $g^{-1}$ @ 10 A $g^{-1}$). It is noteworthy that IC-RGO-15 possessed a higher capacitance compared with other 3D architectured graphene based nanomaterials reported in the literature.[8c,15] The charging/discharging stability of IC-RGO-15 was further evaluated. As shown in FIG. 10B, no capacitance drop was observed over the 5000 cycles @10 A $g^{-1}$, confirming that IC-RGO exhibited excellent stability due to covalent linkages and its 3D interconnected superstructure.

In summary, we have demonstrated a new one-pot approach, which can effectively generate 3D interconnected reduced graphene oxide from graphite. The method has several advantages, including (i) the removal of a significant amount of oxygen functional groups from GO without the use of reducing agents; (ii) interconnection is enabled by covalent linkages through the formation of ethers and esters without the use of external linkers; (iii) the reduction and interconnection processes are rapid and simultaneous; and (iv) this process is facile, economical and easy to scale up for the mass production of 3D graphene superstructures. The produced IC-RGO represents a new class of 3D platform, which is promising for many graphene related applications such as sensors, catalysts, supercapacitors, batteries, adsorbents, and filters. For example, the fabricated IC-RGO exhibited a high capacitance with superb charging and discharging stability due to covalent interconnections and a unique 3D superstructure. Overall, the new SHM and the novel IC-RGO developed in this study will facilitate the research and development of new types of 3D hybrids and functional graphene nanocomposites for promising energy and environmental applications.

The invention will now be further elucidated and illustrated by way of examples. However, the invention is not necessarily limited to the inventions.

EXPERIMENTAL SECTION

Example 1—One-Pot Synthesis of IC-RGO Using a New Streamlined Hummers Method A new two-step Streamlined Hummers Method (SHM) was proposed in this study. In the first step, graphite was treated similarly to the GO synthesis procedure,[6,7a] albeit with some modifications. Briefly, 2.0 g of high purity graphite powder (Zenyatta Ventures Ltd. Albany Graphite Deposit) was added to a 9:1 mixture of concentrated $H_2SO_4$ (98%, Sigma Aldrich, 180 ml): $H_3PO_4$ (85%, Fisher, 20 ml), and vigorously stirred at 50° C. for 2 hours. Then 9.0 g of $KMnO_4$ (Sigma Aldrich) was then added slowly, and the reaction mixture was continuously stirred for 15 hours at 50° C. The obtained brown color reaction mixture was subsequently cooled to 10° C., and 5.0 mL $H_2O_2$ (30%, Sigma Aldrich) was slowly added to the reaction mixture under stirring. During the second step, the reaction vessel was placed on a pre-heated hotplate at 120° C. for various time periods of 5, 10, 15, and 20 minutes, with the resulting products denoted as IC-RGO-(5, 10, 15, and 20), respectively. During this treatment, the color of the reaction mixture was transformed from brown to black. The black colored IC-RGO product was then isolated by centrifugation. Afterwards, it was thoroughly rinsed with water, HCl (30 wt. % Sigma Aldrich), and ethanol (Green Field Inc.), and then soaked in diethyl ether. For comparison, one batch of GO sample was collected following the first step of SHM and purified using the aforementioned procedure. Finally, the resulting GO and IC-RGO were dried overnight at 50° C. To produce thermally reduced graphene oxide (T-RGO), GO was reduced by a procedure reported in the literature.[16] Briefly, an alumina boat containing the GO sample was kept in a tubular furnace under a flow of argon gas, and the furnace was heated at the ramp rate of 5° C. $min^{-1}$ to attain 900° C. The temperature was then maintained for 1 hour after which the system was naturally cooled to room temperature.

Example 2—Characterization

A field-emission scanning electron microscope (Hitachi SU-70) was employed to characterize the morphology of the synthesized GO, IC-RGO, and T-RGO. X-ray diffraction studies were conducted using a Pananalytical Xpert Pro Diffractometer with Ni filtered monochromatic Cu Kr (1.5406 Å, 2.2 KW Max). Fourier transform infrared spectra were recorded on a Nicolet 8700 FT-IR with a MCTIA detector. X-ray photoelectron spectroscopic analysis was performed using a Thermo Fisher XPS system, where the size of the X-ray spot was 400 μm using an Al Kα monochromatic source. To quantify the defect density of the synthesized samples, micro-Raman analysis was conducted using a 514 nm laser excitation. Based on the ID/IG ratio obtained from the Raman spectra, crystallite sizes of the IC-RGO nanomaterials were calculated using the following equation.[17]

$$L_a = (2.4 \times 10^{-10}) \times \lambda^4 \times \left(\frac{I_D}{I_G}\right)^{-1}$$

where La is the crystallite size (in nm), λ is the laser line wavelength (in nm). The calculated La values of the synthesized IC-RGO nanomaterials were compared. Atomic force microscope (Agilent) analysis was employed to measure the thickness of the GO sheets. Transmission electron microscopic (JEOL 2010F) images were recorded with a resolution of 0.23 nm.

Example 3—Preparation of Electrodes and Super Capacitor Study

A 4.0 mg sample of GO, IC-RGO, or T-RGO was added into a mixture of 950 μl $H_2O$ and 50 μl of Nafion (10 wt. %, Sigma Aldrich). The mixture was sonicated for 30 minutes, after which aliquots of these inks were cast on a pre-cleaned glassy carbon electrode (CH instruments Inc.; diameter 3.0 mm), and finally the drop-cast electrode was dried at room temperature for 30 minutes with an overall mass loading of 0.170 mg $cm^{-2}$. A CH Electrochemical work station (CHI 660E) was employed for the electrochemical measurements. Cyclic voltammetry (CV) was performed in 0.5 M $H_2SO_4$ in the potential range between 0.0 to 1.0 V at varied scan rates. Electrochemical impedance spectroscopic measurements were carried out at 0.325 V in the frequency range of from 100 kHz to 0.01 Hz. The experimental EIS data was fitted using the following equivalent electrical circuit.

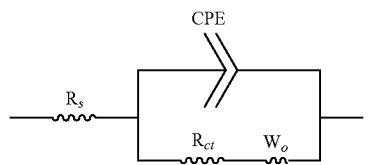

where $R_s$ is the solution resistance; $R_{ct}$ is the charge transfer resistance; CPE is the constant phase element; and $W_O$ is the Warburg element. The fitted parameters of the IC-RGO are compared in Table 3. Charging and discharging curves were recorded in 0.5 M $H_2SO_4$ at two different rates (1 A $g^{-1}$ & 10 A $g^{-1}$). The charging/discharging stability of IC-RGO-15 was tested at 10 A $g^{-1}$. The specific capacitance of IC-RGO was calculated from the CV and charging/discharging experiments using the following equations (1) and (2), respectively.

$$C_{spc} = \frac{Q}{2mv\Delta V} \quad (Eq. 1)$$

where $C_{spc}$ is the specific capacitance (in F $g^{-1}$); Q is the total voltammetric charge obtained by integration of positive and negative sweeps of the CV curves recorded 0.5 M $H_2SO_4$; m is the mass of the active materials (in g); u is scam speed (in V $s^{-1}$); and ΔV is the potential window (in V).

The specific capacitance of the electrode was also estimated from the charging-discharging experiment using Equation 2.

$$C_{spc} = \frac{I * \Delta t}{\Delta V * m} \quad (Eq. 2)$$

where $C_{spc}$ is the specific capacitance (in F $g^{-1}$); I is the discharge current (in A); Δt is the total discharge time; ΔV is the potential window obtained from the cutoff potentials ($V_2-V_1$); and m is the mass of the active materials loading on electrode.

The scope of the claims should not be limited by the preferred embodiments set forth in the examples but should be given the broadest interpretation consistent with the description as a whole.

REFERENCES 1 (a) R. Raccichini, A. Varzi, S. Passerini, B. Scrosati, *Nat. Mater.* 2014, 14, 271; (b) X. Huang, Z. Zeng, Z. Fan, J. Liu, H. Zhang, *Adv. Mater.* 2012, 24, 5979; (c) J. Ji, Y. Li, W. Peng, G. Zhang, F. Zhang, X. Fan, *Adv. Mater.* 2015, 27, 5264; (d) A. R. Thiruppathi, B. Sidhureddy, W. Keeler, A. Chen, *Electrochem. Commun.* 2017, 76, 42; (e) B. Wang, C. Hu, L. Dai, Chem. Commun. 2016, 52, 14350; (f) M. Govindhan, B. Mao, A. Chen, *Nanoscale* 2016, 8, 1485.

2 (a) D. K. James, J. M. Tour, *Acc. Chem. Res.* 2013, 46, 2307; (b) D. Voiry, J. Yang, J. Kupferberg, R. Fullon, C. Lee, H. Y. Jeong, H. S. Shin, M. Chhowalla, *Science*, 2016, 353, 1413.

3 (a) C. N. R. Rao, H. S. S. R. Matte, K. S. Subrahmanyam, *Acc. Chem. Res.* 2013, 46, 149; (b) A. Ambrosi, C. K. Chua, A. Bonanni, M. Pumera, *Chem. Rev.* 2014, 114, 7150; (c) C. Mattevi, G. Eda, S. Agnoli, S. Miller, K. A. Mkhoyan, O. Celik, D. Mastrogiovanni, G. Granozzi, E. Carfunkel, M. Chhowalla, Adv. Funct. Mater. 2009, 19, 2577.

4 D. C. Brownson, D. K. Kampouris, C. E. Banks, *Chem. Soc. Rev.* 2012, 41, 6944.

5 (a) Y. Huang, J. Liang, Y. Chen, Small 2012, 8, 1805; (b) J. Liu, J. Tang, J. J. Gooding, *J. Mater. Chem.* 2012, 22, 12435.

6 D. C. Marcano, D. V. Kosynkin, J. M. Berlin, A. Sinitskii, Z. Sun, A. Slesarev, L. B. Alemany, W. Lu, J. M. Tour, *ACS Nano* 2010, 4, 4806.

7 (a) A. Mathkar, T. N. Narayanan, L. B. Alemany, P. Cox, P. Nguyen, G. Gao, P. Chang, R. Romero-Aburto, S. A. Mani, P. M. Ajayan, *Part. Part. Syst. Charact.* 2013, 30, 266; (b) S. Boopathi, T. N. Narayanan, S. Senthil Kumar, *Nanoscale* 2014, 6, 10140; (c) C. K. Chua, M. Pumera, *Chem. Soc. Rev.* 2014, 43, 291.

8 (a) J. Lin, C. Zhang, Z. Yan, Y. Zhu, Z. Peng, R. H. Hauge, D. Natelson, J. M. Tour, *Nano Lett.* 2013, 13, 72; (b) X. Wang et al., *Nat. Commun.* 2013, 4, 2905; (c) T. V. Vineesh, S. Alwarappan, T. N. Narayanan, *Nanoscale* 2015, 7, 6504; (d) P. M. Sudeep et al., *ACS Nano* 2013, 7, 7034; (e) C. Li, X. Zhang, K. Wang, X. Sun, G. Liu, J. Li, H. Tian, J. Li, Y. Ma, *Adv. Mater.* 2017, 29, 1604690.

9 S. Sattayasamitsathit, Y. E. Gu, K. Kaufmann, W. Z. Jia, X. Y. Xiao, M. Rodriguez, S. Minteer, J. Cha, D. B. Burckel, C. M. Wang, et al., *J. Mater. Chem. A* 2013, 1, 1639.

10 (a) Z. Chen, W. Ren, L. Gao, B. Liu, S. Pei, H.-M. Cheng, *Nat. Mater.* 2011, 10, 424; (b) L. Jiang, Z. Fan, *Nanoscale* 2014, 6, 1922; (c) Y. Zhu, L. Li, C. Zhang, G. Casillas, Z. Sun, Z. Yan, G. Ruan, Z. Peng, A.-R. O. Raji, C. Kittrell, et al., *Nat. Commun.* 2012, 3, 1225.

11 Y. Xu, Q. Wu, Y. Sun, H. Bai, G. Shi, *ACS Nano* 2010, 4, 7358.

12 (a) W. Zhang, J. Zheng, Z. Lin, L. Zhong, J. Shi, C. Wei, H. Zhang, A. Hao, S. Hu, *Anal. Methods* 2015, 7, 6089; (b) Y. Wang, L. Zhou, S. Wang, J. Li, J. Tang, S. Wang, Y. Wang, *RSC Adv.* 2016, 6, 69815; (c) C. E. Immoos, S. J. Lee, M. W. Grinstaff, *J. Am. Chem. Soc.* 2004, 126, 10814; (d) L. A. Mercante, A. Pavinatto, L. E. O. Iwaki, V. P. Scagion, V. Zucolotto, O. N. Oliveira, L. H. C. Mattoso, D. S. Correa, *ACS Appl. Mater. Interfaces* 2015, 7, 4784.

13 J. William S. Hummers, R. E. Offeman, *J. Am. Chem. Soc.* 1958, 80, 1339.

14 (a) Y. Xu, C.-Y. Chen, Z. Zhao, Z. Lin, C. Lee, X. Xu, C. Wang, Y. Huang, M. I. Shakir, X. Duan, *Nano Lett.* 2015, 15, 4605; (b) M. R. Lukatskaya, B. Dunn, Y. Gogotsi, *Nat. Commun.* 2016, 7, 12647; (c) S. Han, D. Wu, S. Li, F. Zhang, X. Feng, *Adv. Mater.* 2014, 26, 849; (d) L. Ma, M. Zheng, S. Liu, Q. Li, Y. You, F. Wang, L. Ma, W. Shen, *Chem. Commun.* 2016, 52, 13373.

15 (a) Y. Xu, Z. Lin, X. Huang, Y. Liu, Y. Huang, X. Duan, *ACS Nano* 2013, 7, 4042; (b) X. Zhang, H. Zhang, C. Li, K. Wang, X. Sun, Y. Ma, *RSC Adv.* 2014, 4, 45862; (c) Y. Xu, K. Sheng, C. Li, G. Shi, *ACS Nano* 2010, 4, 4324.

16 N.-J. Song, C.-M. Chen, C. Lu, Z. Liu, Q.-Q. Kong, R. Cai, *J. Mater. Chem. A* 2014, 2, 16563.

17 L. G. Cancado, K. Takai, T. Enoki, M. Endo, Y. A. Kim, H. Mizusaki, A. Jorio, L. N. Coelho, R. Magalhaes-Paniago, M. A. Pimenta, *Appl. Phys. Lett.* 2006, 88, 163106.

18 A. L. Higginbotham, D. V. Kosynkin, A. Sinitskii, Z. Sun, J. M. Tour, Lower-defect graphene oxide nanoribbons from multiwalled carbon nanotubes, ACS Nano. 4 (2010) 2059-2069. doi:10.1021/nn100118m.

19. S. Eigler, A. Hirsch, Chemistry with graphene and graphene oxide—Challenges for synthetic chemists, Angew. Chemie—Int. Ed. 53 (2014) 7720-7738. doi: 10.1002/anie.201402780.

TABLE 1

Quantitative distribution of components in deconvoluted C1s spectra of GO, IC-RGO-15, and T-RGO from FIG. 3B.

| Material | C=C (%) | C—C (%) | C—O (%) | C=O (%) | O—C=O (%) |
|---|---|---|---|---|---|
| GO | 27.1 | 10.6 | 29.1 | 21.1 | 12.1 |
| IC-RGO-15 | 54.8 | 11.7 | 15.9 | 7.8 | 9.8 |
| T-RGO | 63.7 | 10.5 | 12.9 | 6.4 | 6.3 |

TABLE 2

Defect density of the synthesized GO, IC-RGO, and T-RGO nanomaterials.

| Material | $I_D/I_G$ | $L_a$ (nm) |
|---|---|---|
| GO | 0.89 | 18.82 |
| IC-RGO-5 | 0.87 | 19.26 |
| IC-RGO-10 | 0.86 | 19.48 |
| IC-RGO-15 | 0.84 | 19.94 |
| IC-RGO-20 | 0.91 | 18.41 |
| T-RGO | 0.97 | 17.27 |

TABLE 3

Equivalent circuit parameters of GO, IC-RGO, and T-RGO obtained from Nyquist plots by fitting.

| Material | $R_s$ (Ω) | $R_{ct}$ (Ω) | CPE-T (μF) | CPE-P | W (Ω) |
|---|---|---|---|---|---|
| GO | 8.9 | 359.0 | 2.1 | 0.9 | 894.0 |
| IC-RGO-5 | 8.9 | 220.0 | 5.5 | 0.8 | 750.0 |
| IC-RGO-10 | 9.3 | 132.9 | 5.8 | 0.8 | 733.3 |
| IC-RGO-15 | 9.4 | 17.0 | 7.0 | 0.8 | 55.9 |
| IC-RGO-20 | 9.0 | 83.4 | 7.1 | 0.8 | 242.7 |
| T-RGO | 8.3 | 29.3 | 8.6 | 0.7 | 598.0 |

The invention claimed is:

1. A method of producing an interconnected, reduced graphene oxide comprising:
   (a) oxidizing a quantity of graphite for about 10 to 20 hours with an acid mixture comprising manganese, thereby producing a layer structured graphene oxide; and
   (b) removing functional groups from the graphene oxide by heating the layer structure graphene oxide to 100-120° C. for 5-20 minutes to form reduced graphene oxide, said reduced graphene oxide simultaneously forming covalent linkages, thereby forming three dimension, interconnected, reduced graphene oxide sheets.

2. The method according to claim 1 wherein the manganese is permanganate oxidant.

3. The method according to claim 1 wherein step (a) is carried out at about 50° C.

4. The method according to claim 1 wherein between step (a) and step (b), the temperature of the layer structured graphene oxide is reduced to about 10° C.

5. The method according to claim 4 wherein $H_2O_2$ is added during the temperature reduction.

6. The method according to claim 1 wherein, after step (b), the interconnected, reduced graphene oxide sheets are rinsed.

7. The method according to claim 1 wherein step (a) and step (b) are carried out in one reaction vessel.

8. The method according to claim 1 wherein the interconnection of the graphene oxide sheets was simultaneously enabled through covalent linkages without the addition of external linkers.

9. The method according to claim 1 wherein the layer structure graphene oxide to 100-120° C. for about 15 minutes.

10. The method according to claim 1 wherein the three dimension, interconnected, reduced graphene oxide sheets comprise at least 5 layers of graphene.

11. The method according to claim 10 wherein distance between each layer is about 0.37 nm.

* * * * *